US012412105B2

(12) United States Patent
Tiwari et al.

(10) Patent No.: US 12,412,105 B2
(45) Date of Patent: Sep. 9, 2025

(54) AUTOMATED COMPOSITING OF CONTENT COMPILATIONS

(71) Applicant: Disney Enterprises, Inc., Burbank, CA (US)

(72) Inventors: Sanchita Tiwari, Trumbull, CT (US); Dirk Van Dall, Shelter Island, NY (US); Jayadas Devassy, Westport, CT (US)

(73) Assignee: Disney Enterprises, Inc., Burbank, CA (US)

( * ) Notice: Subject to any disclaimer, the term of this patent is extended or adjusted under 35 U.S.C. 154(b) by 1190 days.

(21) Appl. No.: 17/225,898

(22) Filed: Apr. 8, 2021

(65) Prior Publication Data
US 2022/0327402 A1 Oct. 13, 2022

(51) Int. Cl.
G06N 20/00 (2019.01)
G06F 18/22 (2023.01)
(Continued)

(52) U.S. Cl.
CPC ............ *G06N 5/04* (2013.01); *G06F 18/22* (2023.01); *G06N 20/00* (2019.01); *G06V 10/751* (2022.01);
(Continued)

(58) Field of Classification Search
CPC .......... G06N 5/04; G06N 20/00; G06N 3/006; G06F 18/22; G06V 10/751; G06V 20/46;
(Continued)

(56) References Cited

U.S. PATENT DOCUMENTS 7,222,300 B2   5/2007   Toyama et al.
8,228,372 B2   7/2012   Griffin
(Continued)

FOREIGN PATENT DOCUMENTS

WO   WO 2016/128984 A1   8/2016
WO   WO 2018/129585 A1   7/2018
WO   WO-2024141566 A1 *  7/2024   ......... G06Q 30/0631

OTHER PUBLICATIONS

"Towards Playlist Generation Algorithms Using RNNs Trained on Within-Track Transitions" by Choi et al. (SOAP 2016).
(Continued)

*Primary Examiner* — Helen Shibru
(74) *Attorney, Agent, or Firm* — Farjami & Farjami LLP

(57) ABSTRACT

A system includes a computing platform having processing hardware and a memory storing a software code. The processing hardware is configured to execute the software code to receive multiple content units each including a start descriptor for an initial content segment and an end descriptor for a last content segment, identify the start descriptor and the end descriptor for each of the content units, and select a first content unit for beginning a content compilation. The processing hardware is further configured to execute the software code to determine multiple similarity metrics each comparing the end descriptor of the first content unit with the start descriptor of a respective one of the other content units, rank, using the similarity metrics, the other content units with respect to one another, select, based on the rank, a second content unit, and composite the content compilation using the second content unit.

20 Claims, 11 Drawing Sheets

(51) Int. Cl.
  *G06N 5/04* (2023.01)
  *G06V 10/75* (2022.01)
  *G06V 20/40* (2022.01)
  *G11B 27/031* (2006.01)

(52) U.S. Cl.
  CPC .............. *G06V 20/46* (2022.01); *G06V 20/48* (2022.01); *G11B 27/031* (2013.01)

(58) Field of Classification Search
  CPC ...... G06V 20/48; G06V 10/74; G11B 27/031; G11B 27/28
  USPC ........................................................ 386/278
  See application file for complete search history.

(56) References Cited

U.S. PATENT DOCUMENTS

| | | | | |
|---|---|---|---|---|
| 8,873,853 | B2* | 10/2014 | Rodriguez | G06F 18/40 382/167 |
| 9,208,384 | B2* | 12/2015 | Conwell | G06F 16/587 |
| 10,319,410 | B1* | 6/2019 | Townsend | G11B 27/30 |
| 10,482,857 | B2 | 11/2019 | Lyske | |
| 10,516,900 | B2 | 12/2019 | Venkatraman et al. | |
| 10,616,625 | B2 | 4/2020 | Huang et al. | |
| 10,650,245 | B2 | 5/2020 | Swaminathan et al. | |
| 10,949,649 | B2* | 3/2021 | Walker | G06F 18/214 |
| 11,372,914 | B2* | 6/2022 | Kumar | G06F 16/538 |
| 11,544,535 | B2* | 1/2023 | Lee | G06F 17/10 |
| 11,922,122 | B2* | 3/2024 | Bullock | G06F 40/279 |
| 12,047,646 | B2* | 7/2024 | N'guessan | H04N 21/4668 |
| 12,056,212 | B2* | 8/2024 | Virodov | G06V 10/464 |
| 2015/0268932 | A1 | 9/2015 | Reblitz-Richardson et al. | |
| 2016/0132935 | A1* | 5/2016 | Shen | G06Q 30/0269 705/14.66 |
| 2021/0406606 | A1* | 12/2021 | Oleson | G06F 18/28 |
| 2022/0075994 | A1* | 3/2022 | Shapira | G06N 3/08 |
| 2023/0245329 | A1* | 8/2023 | Miao | G06T 7/162 382/103 |
| 2023/0360071 | A1* | 11/2023 | Wu | G06Q 10/067 |
| 2024/0338860 | A1* | 10/2024 | Trzyna | G06F 40/44 |

OTHER PUBLICATIONS

"Biteable—Best explainer videos" (Biteable 2021) https://biteable.com/blog/best-explainer-videos/.
"Kamua" (Kamua 2021) https://kamua.com/.
"MAGIX Magazine—Fastcut" (Magix 2021) http://magazine.magix.com/en/fastcut-fully-automated-video-editing/.

* cited by examiner

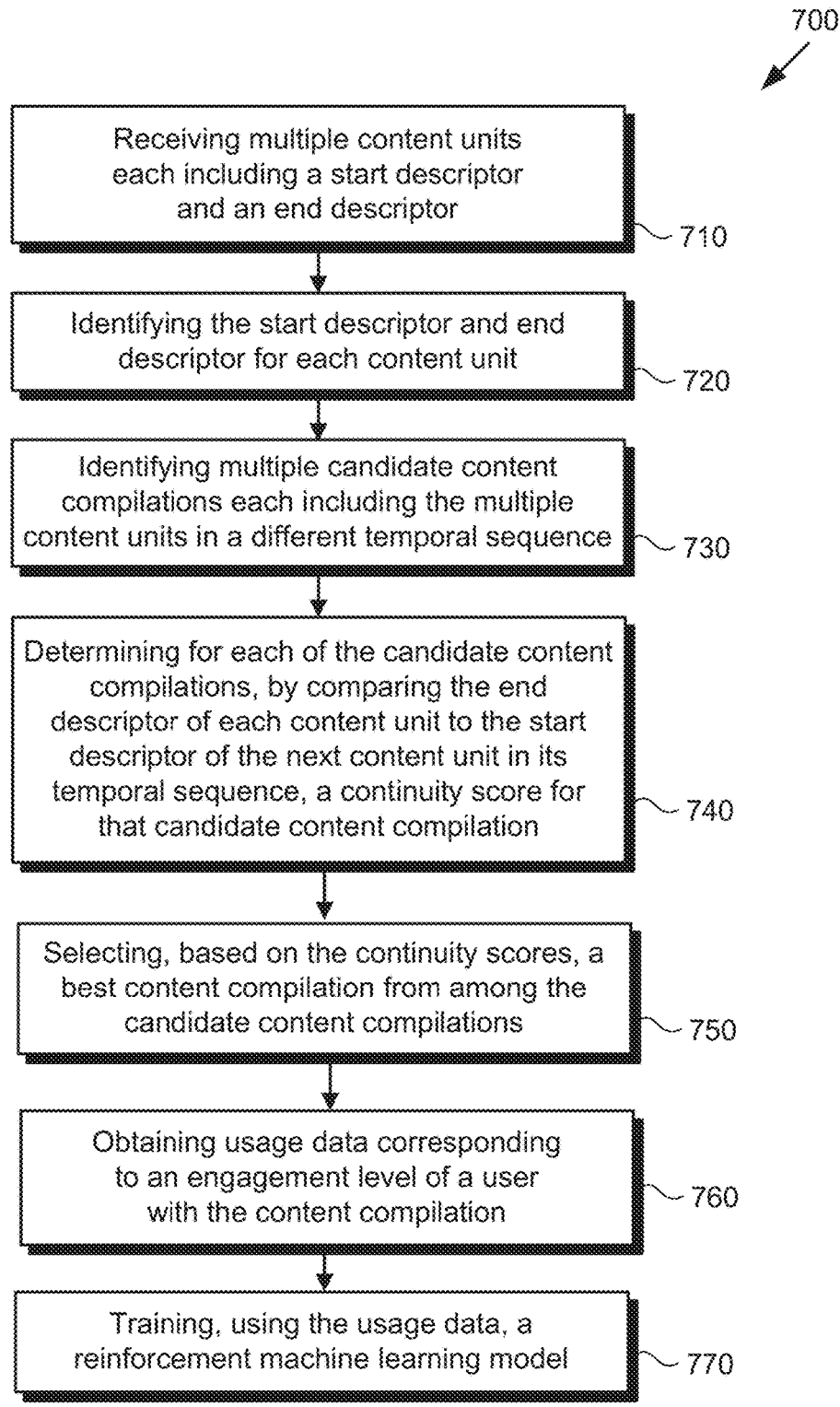

AUTOMATED COMPOSITING OF CONTENT COMPILATIONS

BACKGROUND

Joining or merging discrete units of content is a common task in content creation. For example, multiple video clips may be merged by a professional video editor in a studio, or by an amateur user via an online social media platform or utilizing a commercial software application. However, conventional solutions for merging discrete content units to form a content compilation achieve good results only when working with content that has a common theme or context running through the content units. For instance, where the content units are video clips, the clips being merged are typically from sporting events, celebrations, vacations, home videos, or educational tutorials, to name a few examples. In the conventional art, video clips selected from multiple different topics or themes tend to produce poor composite videos that may be jarring to watch and listen to due to abrupt transitions of visual style, thematic subject matter, and sound effects. Consequently, there is a need in the art for an automated solution for compositing disparate units of content from a broad range of topics, many of which may have different audio-visual characteristics or styles, to produce a compilation of that content that is appealing, especially where these compilations are unique for each user and human involvement cannot be afforded.

BRIEF DESCRIPTION OF THE DRAWINGS

FIG. 7 shows a flowchart presenting an exemplary method for use by a system to perform automated compositing of content compilations, according to another implementation.

DETAILED DESCRIPTION

Figure 1:
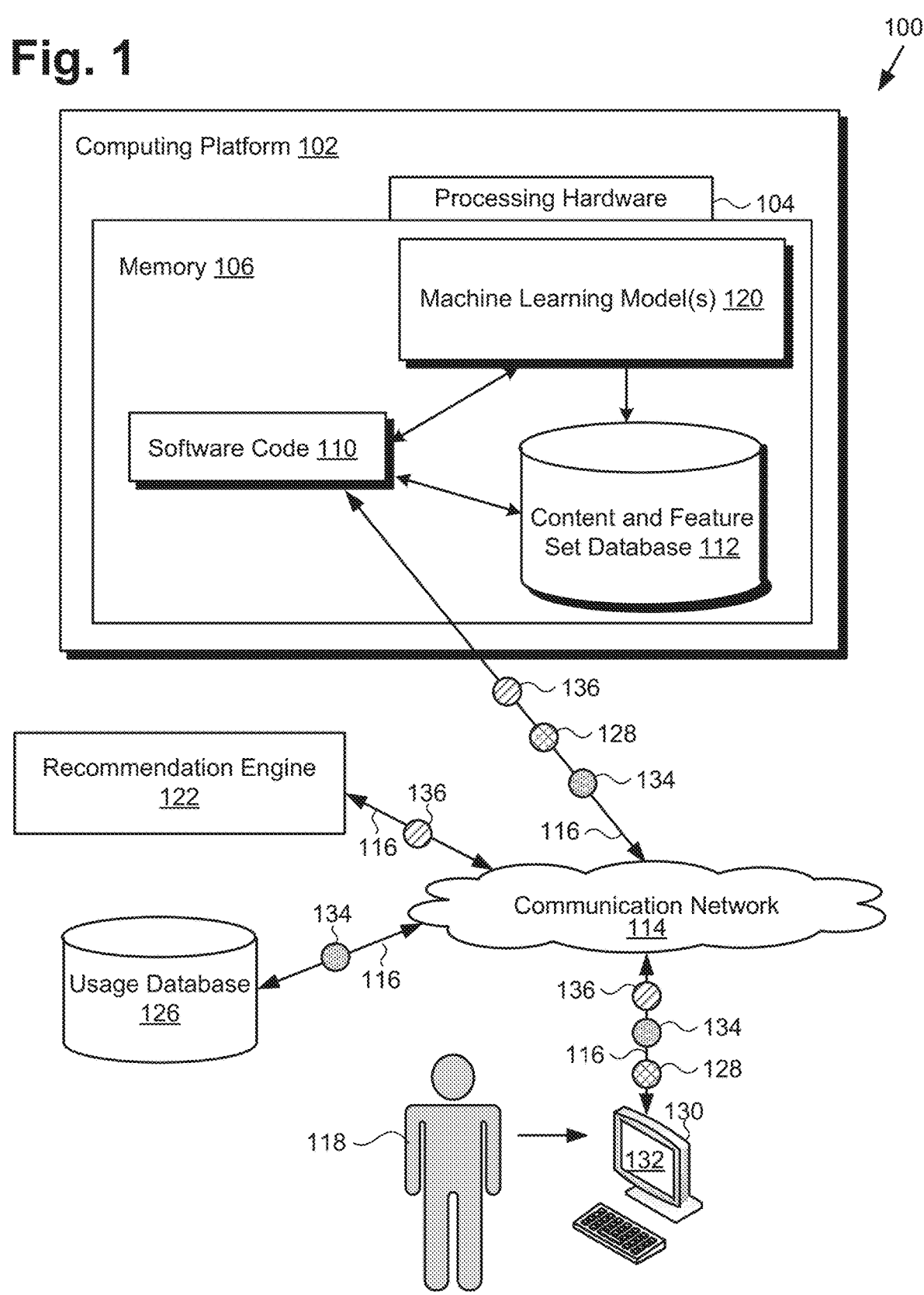
FIG. 1 shows a diagram of a system for performing automated compositing of content compilations, according to one exemplary implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

The present application is directed to automated systems and methods for compositing content compilations that address and overcome the deficiencies in the conventional art. According to the present automated compositing solution, information about features of content units, such as their audio features, the images they include, and their semantic features, for example, are extracted and used to automate the compositing of the content units in a manner that produces results comparable in quality to those produced by an expert human content editor. In contrast to conventional techniques for creating content compilations, the present solution can advantageously work with content that spans a wide range of themes and topics, as well as a host of visual styles and audio tracks created by different artists in different settings and for different purposes. In addition, according to the present compositing solution a user supplied template or layout, which is typically relied upon in conventional content compilation techniques, is neither sought nor utilized. As a result, the present solution advantageously enables the automated production of a coherent content compilation without abrupt switches in visual style, story arc, or audio effects.

As defined in the present application, the terms "automation," "automated," and "automating" refer to systems and processes that do not require human intervention. Although in some implementations a human editor may review the content compilations composited by the systems and using the methods described herein, that human involvement is optional. Thus, the methods described in the present application may be performed under the control of hardware processing components of the disclosed automated systems.

Moreover, as defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models. Bayesian models, or neural networks (NNs).

A "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network. In various implementations, NNs may be trained as classifiers and may be utilized to perform image processing or natural-language processing.

FIG. 1 shows a diagram of system 100 for performing automated compositing of content compilations, according to one exemplary implementation. As shown in FIG. 1, system 100 includes computing platform 102 having processing hardware 104 and system memory 106 implemented as a computer-readable non-transitory storage device. According to the present exemplary implementation, system memory 106 stores software code 110, one or more machine learning models 120 (hereinafter "machine learning model(s) 120"), and content and feature set database 112 storing features extracted from a curated set of content units by machine learning model(s) 120.

As further shown in FIG. 1, system 100 is implemented within a use environment including communication network 114 providing network communication links 116, recommendation engine 122, usage database 126, user system 130 including display 132, and user 118 of user system 130. Also shown in FIG. 1 are multiple content units 136, content compilation 128 composited by system 100 using software code 110 (hereinafter "composited content compilation 128"), and usage data 134 corresponding to the engagement level of user 118 with composited content compilation 128.

Although the present application refers to one or more of software code 110, machine learning model(s) 120, and content and feature set database 112 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal that provides instructions to processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts software code 110, machine learning model(s) 120, and content and feature set database 112 as being co-located in system memory 106, that representation is also merely provided as an aid to conceptual clarity. More generally, system 100 may include one or more computing platforms 102, such as computer servers for example, which may be co-located, or may form an interactively linked but distributed system, such as a cloud-based system, for instance. As a result, processing hardware 104 and system memory 106 may correspond to distributed processor and memory resources within system 100. Consequently, in some implementations, one or more of software code 110, machine learning model(s) 120, and content and feature set database 112 may be stored remotely from one another on the distributed memory resources of system 100.

Processing hardware 104 may include multiple hardware processing units, such as one or more central processing units, one or more graphics processing units, and one or more tensor processing units. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. Moreover, in some implementations, communication network 114 may be a high-speed network suitable for high performance computing (HPC), for example a 10 GigE network or an Infiniband network.

Although user system 130 is shown as a desktop computer in FIG. 1, that representation is provided merely as an example as well. More generally, user system 130 may be any suitable mobile or stationary computing device or system that includes display 132 and implements data processing capabilities sufficient to implement the functionality ascribed to user system 130 herein. For example, in other implementations, user system 130 may take the form of a laptop computer, tablet computer, or smartphone, for example.

With respect to display 132 of user system 130, display 132 may be implemented as a liquid crystal display (LCD), light-emitting diode (LED) display, organic light-emitting diode (OLED) display, quantum dot (QD) display, or any other suitable display screen that perform a physical transformation of signals to light. Furthermore, display 132 may be physically integrated with user system 130 or may be communicatively coupled to but physically separate from user system 130. For example, where user system 130 is implemented as a smartphone, laptop computer, or tablet computer, display 132 will typically be integrated with user system 130. By contrast, where user system 130 is implemented as a desktop computer, display 132 may take the form of a monitor separate from user system 130 in the form of a computer tower.

The functionality of software code 110 will be further described by reference to FIG. 2, which shows flowchart 200 presenting an exemplary method for use by system 100 to perform automated compositing of content compilations, according to one implementation. With respect to the actions outlined in FIG. 2, it is noted that certain details and features have been left out of flowchart 200 in order not to obscure the discussion of the inventive features in the present application.

Figure 2:
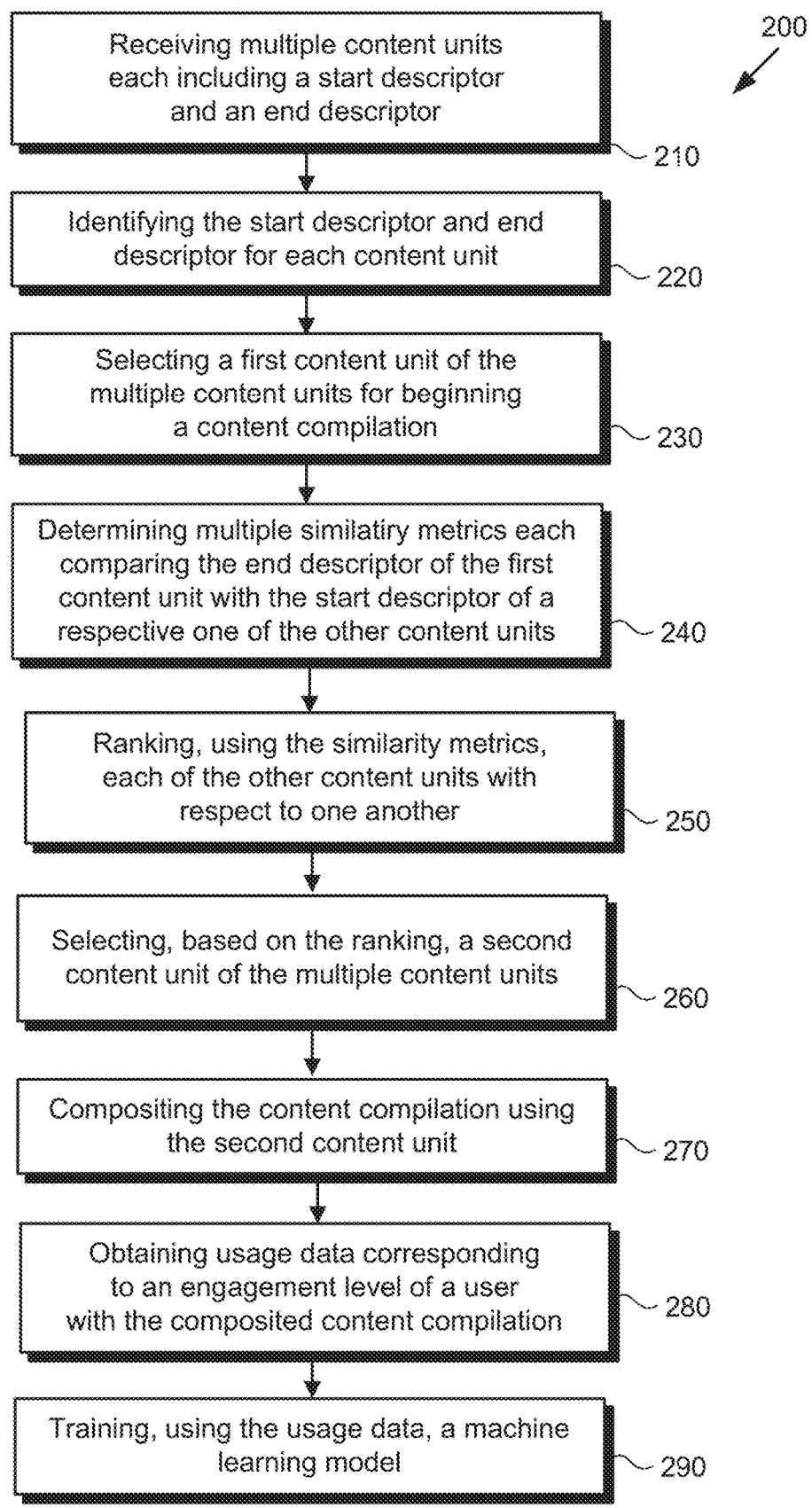
FIG. 2 shows a flowchart presenting an exemplary method for use by a system to perform automated compositing of content compilations, according to one implementation.

Referring to FIG. 2 in combination with FIG. 1, flowchart 200 begins with receiving multiple content units 136, each one of the content units including a start descriptor for an initial content segment and an end descriptor for a last content segment (action 210). Multiple content units 136 may span a wide range of themes and topics including wildlife and nature, fantasy, action-adventure, animation, live action, to name a few examples, as well as content having a host of different visual styles and audio tracks created by different artists in different settings and for different purposes. Moreover, multiple content units 136 may include clips of audio-video (AV) content, audio clips without video, or video clips without audio, for example. In addition, each content unit may include semantic features, such as a written synopsis, as well as metadata tags identifying keywords describing the included content. For instance, in the case of AV content including clips of episodic television (TV) or movie content, that metadata may identify genre type (action, adventure, comedy, fantasy, etc.), lead character type (pirate, princess, superhero, teacher, criminal, etc.), or subject type (educational, coming of age, sci-fi, sports, racing etc.) of the content clips, to name a few examples.

In some implementations, multiple content units 136 may be received by system 100 from user system 130 via communication network 114 and network communication links 116, based on selection inputs to user system 130 by user 118. For example, multiple content units 136 may be content units affirmatively selected by user 118 from a menu of predetermined curated content units that have been annotated to include the synopsis and keyword metadata tags described above. Alternatively, in some implementations multiple content units 136 may be received by system 100 from recommendation engine 122, based on content consumption preferences of user 118 that are known or inferred by recommendation engine 122. In those various implementations, multiple content units 136 may be received by software code 110, executed by processing hardware 104 of computing platform 102.

Figure 3A:
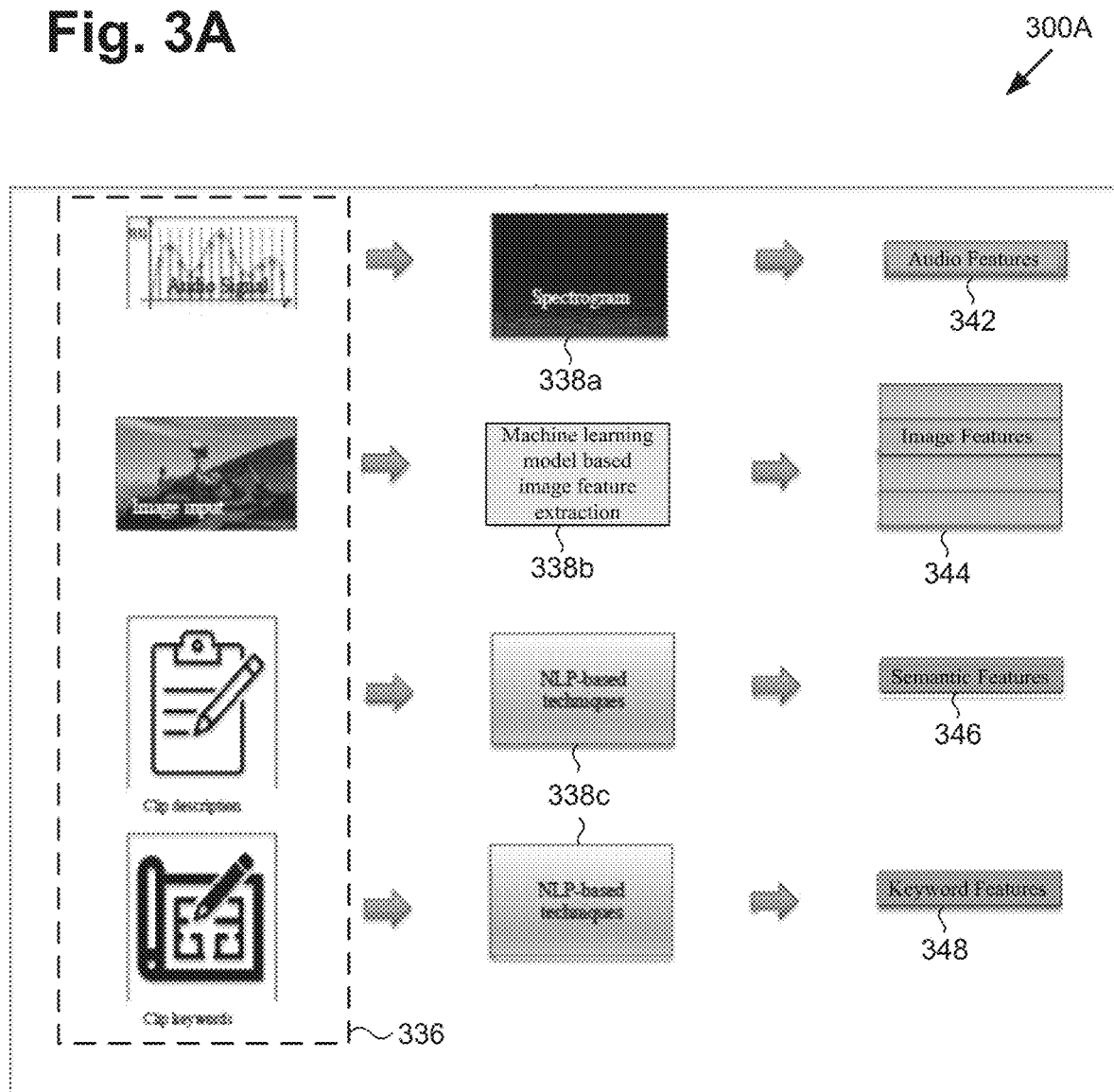
FIG. 3A shows a diagram depicting extraction of an exemplary feature set from a content unit, according to one implementation.
Figure 3B:
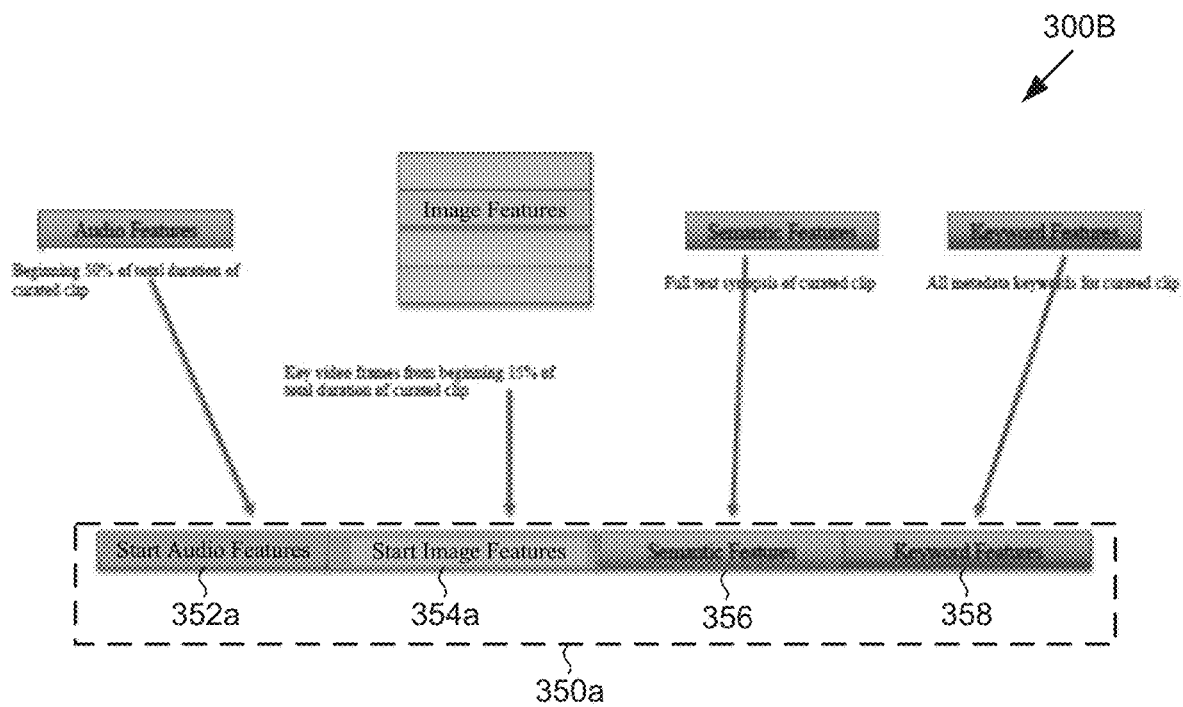
FIG. 3B shows a diagram depicting generation of an exemplary start descriptor and an exemplary end descriptor of a content unit, according to one implementation.
Figure 3B:
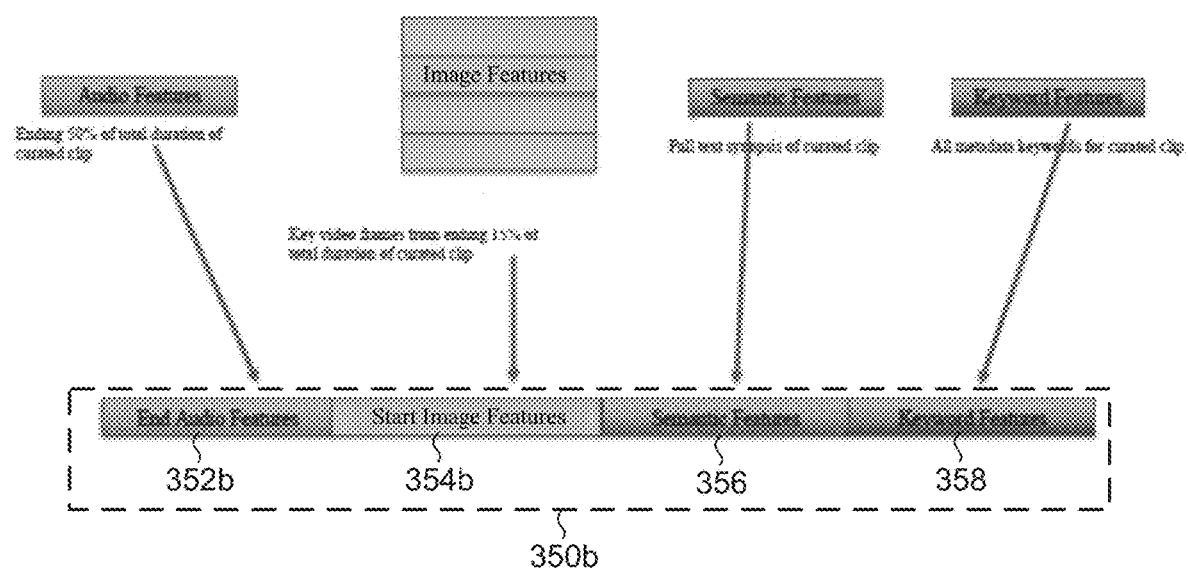

With respect to the start descriptor and end descriptor of each of multiple content units 136, it is noted that those start and end descriptors are generated from a feature set previously extracted from each content unit and stored in content and feature set database 112. Referring to FIGS. 3A and 3B, FIG. 3A shows diagram 300A depicting extraction of an exemplary feature set from content unit 336 in the form of an exemplary AV content clip, according to one implementation, while FIG. 3B shows diagram 300B depicting generation of exemplary start descriptor 350a and end descriptor 350b of content unit 336, according to one implementation. It is noted that content unit 336 corresponds in general to any or all of multiple content units 136, and those corresponding features may share any of the characteristics attributed to content unit 336 by the present disclosure.

As shown in FIG. 3A, a variety of different analytical processes can be used to extract different features included in content unit 336. For example, spectrogram analysis 338a can be used to extract audio features 342 from content unit 336, while one or more machine learning model based image extraction techniques 338b, using one or more of machine learning model(s) 120 in FIG. 1 for example, may be used to extract image features 344. In addition, various natural language processing based (NLP-based) techniques 338c may be used to extract semantic features 346 and keyword features 348 from content unit 336.

The analytical processes performed on content unit 336 result in generation of a multi-valued floating point vector representation (i.e., feature vectors) for each of audio features 342, image features 344, semantic features 346, and keyword features 348. By way of example, and as noted above, signal processing techniques like spectrogram analysis 338a of the audio track included in content unit 336 may be used to identify audio features 342. A trained NN, such as a convolutional NN (CNN) may be used to identify image features 344. For example, VGG-19 is a trained CNN that is very effective at object recognition. The initial layers of this CNN may be used to generate efficient and compact image feature representations for individual video frames.

As described above, content unit 336 may include a written synopsis and metadata tags identifying keywords describing content unit 336. Those text elements can be analyzed with NLP-based techniques 338c such as Global Vectors for Word Representation (GloVe) and Bidirectional Encoder Representations from Transformers (BERT) word embeddings, WordNet, and term frequency-inverse document frequency (TF-IDF) feature generation. These NLP-based techniques enable representation of the clip description and its metadata in a feature vector space where they can be compared, clustered, and classified very efficiently. In addition, the word embedding techniques used allow for handling various categories of ontologies and can handle nuances when synonyms, hyponyms, hypernyms and even contranyms are present.

Rather than utilizing a single set of feature vectors describing the entirety of content unit 336, the present approach contemplates using two sets of feature vectors for each content unit 336, a start feature vector for an initial content segment of content unit 336 and an end feature vector for a last content segment of the content unit. In some implementations, start and end feature vectors are computed only for the audio and image features of content unit 336. In those implementations, one feature vector each is computed for the semantic and keyword features using all of the available textual features of content unit 336.

As a specific example in use cases involving AV content units, video frames from a predetermined time duration or frame count from the beginning and end of content unit 336, such as fifteen percent (15%) of the total time duration or frame count of content unit 336 for example, may be used to compute the start and end image feature vectors. For the audio feature vectors, another predetermined subset of the front half and the end half of the audio track of content unit 336 may be used, such as 50% of each of the front half and back half of the audio track, for example. It is noted that the exemplary percentages described above are hyperparameters that can be set and selectably modified by an administrator of system 100.

Once the feature vector sets for content unit 336 have been identified, a start descriptor for content unit 336 may be generated by concatenating or joining two or more of the start audio feature vector, the start image feature vector, the semantic feature vector for the entire content unit, and the keyword feature vector for the entire content unit together, end-to-end. Analogously, an end descriptor for content unit 336 may be generated by using one or both of the end audio and image feature vectors in similar combination with one or both of the same semantic and keyword feature vectors used to generate the start descriptor. This process is depicted in FIG. 3B, which shows start descriptor 350a and end descriptor 350b of content unit 336.

As shown in FIG. 3B, start descriptor 350a includes start audio feature vector 352a in combination with start image feature vector 354a, semantic feature vector 356, and keyword feature vector 358, while end descriptor 350b includes end audio feature vector 352b in combination with end image feature vector 354b, semantic feature vector 356, and keyword feature vector 358. Thus, for each content unit 336, start descriptor 350a and end descriptor 350b may take the form of respective vectors in a multi-dimensional feature space. Moreover, as noted above, in some implementations, the content units corresponding to content unit 336 may be AV clips from a variety of different genres. In some of those implementations, as shown in FIG. 3B, each of start descriptor 350a and end descriptor 350b may include two or more of an audio feature vector component, an image feature vector component, a keyword feature vector component, and a semantic feature vector component based on a written synopsis of the AV clip.

Flowchart 200 further includes identifying start descriptor 350a and end descriptor 350b for each one of content units 136/336 (action 220). Action 220 may be performed by software code 110, executed by processing hardware 104 of computing platform 102, by accessing content and feature set database 112.

Flowchart 200 further includes selecting a first content unit of multiple content units 136/336 for beginning a content compilation (action 230). The selection of the first content unit in action 230 may be performed by software code 110, executed by processing hardware 104 of computing platform 102. In various implementations, the selection of the first content unit for beginning the content compilation may be performed randomly, or may be based on a first content identifier included in multiple content units 136/336. That is to say, in some implementations the first content unit selected in action 230 may be selected from within a set of contents suggested by recommendation engine 122 or by user 118. However, in other implementations, selection of the first content unit for beginning the content compilation may be performed by software code 110, executed by processing hardware 104 of computing platform 102, in the manner described below by reference to FIGS. 4A and 4B.

Figure 4A:
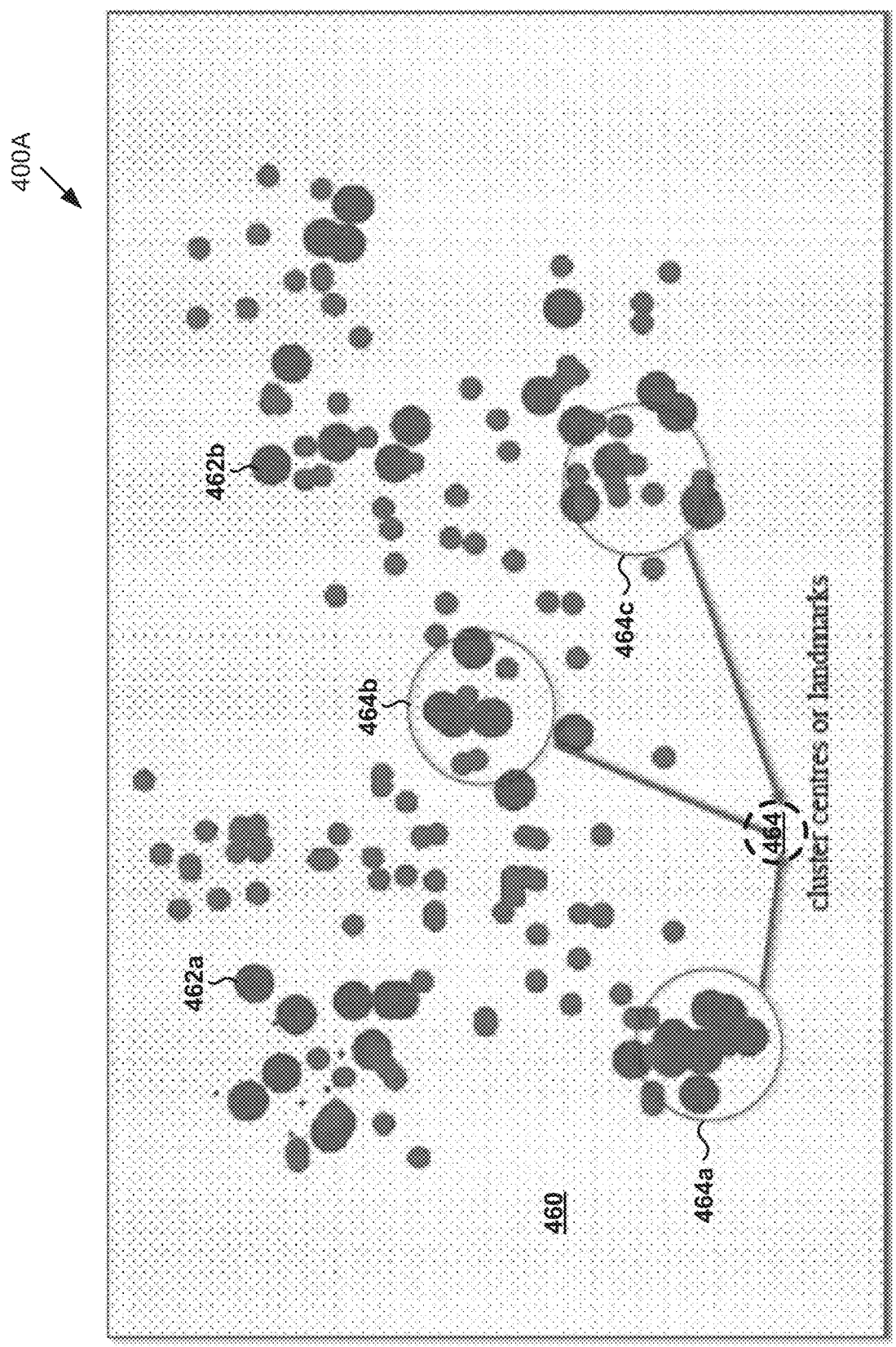
FIG. 4A shows a portion of an exemplary multi-dimensional feature space including feature space landmarks, according to one implementation.

FIG. 4A shows a portion 400A of exemplary multi-dimensional feature space 460 including feature space landmarks 464 represented in FIG. 4A by exemplary feature space landmarks 464a, 464b, and 464c, according to one implementation. Also shown in FIG. 4A are clusters of content units mapped onto multi-dimensional feature space 460 and represented in FIG. 4A by exemplary content clusters 462a and 462b. It is noted that the content units mapped into multi-dimensional feature space 460, in FIG. 4A, correspond in general to content unit 336. Consequently, the content units included in content the clusters represented by exemplary content clusters 462a and 462b may share any of the characteristics attributed to content unit 336 by the present disclosure, and vice versa. It is further noted that the dimensions of multi-dimensional feature space 460 may correspond respectively to some, or all, of the feature vectors characterizing content unit 336. The multi-dimensional feature space may have 3 modes or modalities (audio, visual, and textual), for example with many dimensions in each modality.

As part of the process of training machine learning model(s) 120, in FIG. 1, a corpus of expertly composed content compilations may be aggregated. The content compilations included in this corpus may be produced by expert human content editors, and are known to be well formed and suitable for use as "best-of-class" exemplars for the content compilations to be composited by system 100. The corpus of expertly composed content compilations is aggregated so as to be sizeable and diverse enough to cover substantially all of the visual styles, audio themes, topics, and semantic features that content unit 336 would typically depict. There may also be diversity in how the content units are composited together to form a satisfying narrative arc embodying qualities of good storytelling. For example a good content compilation may have an intriguing start, suspenseful middle, and an exciting end.

Referring to FIG. 4A, the content units included in each expertly composited content compilation are plotted in multi-dimensional feature space 460. A clustering algorithm may then be run that finds content clusters. e.g., content clusters 462a and 462b, as well as cluster centers. i.e., superclusters of the content clusters (hereinafter "feature space landmarks") represented in FIG. 4A by exemplary feature space landmarks 464. It is noted that the number of content clusters and feature space landmarks to be identified by the clustering algorithm is a hyperparameter that can be set and selectably modified by an administrator of system 100.

Figure 4B:
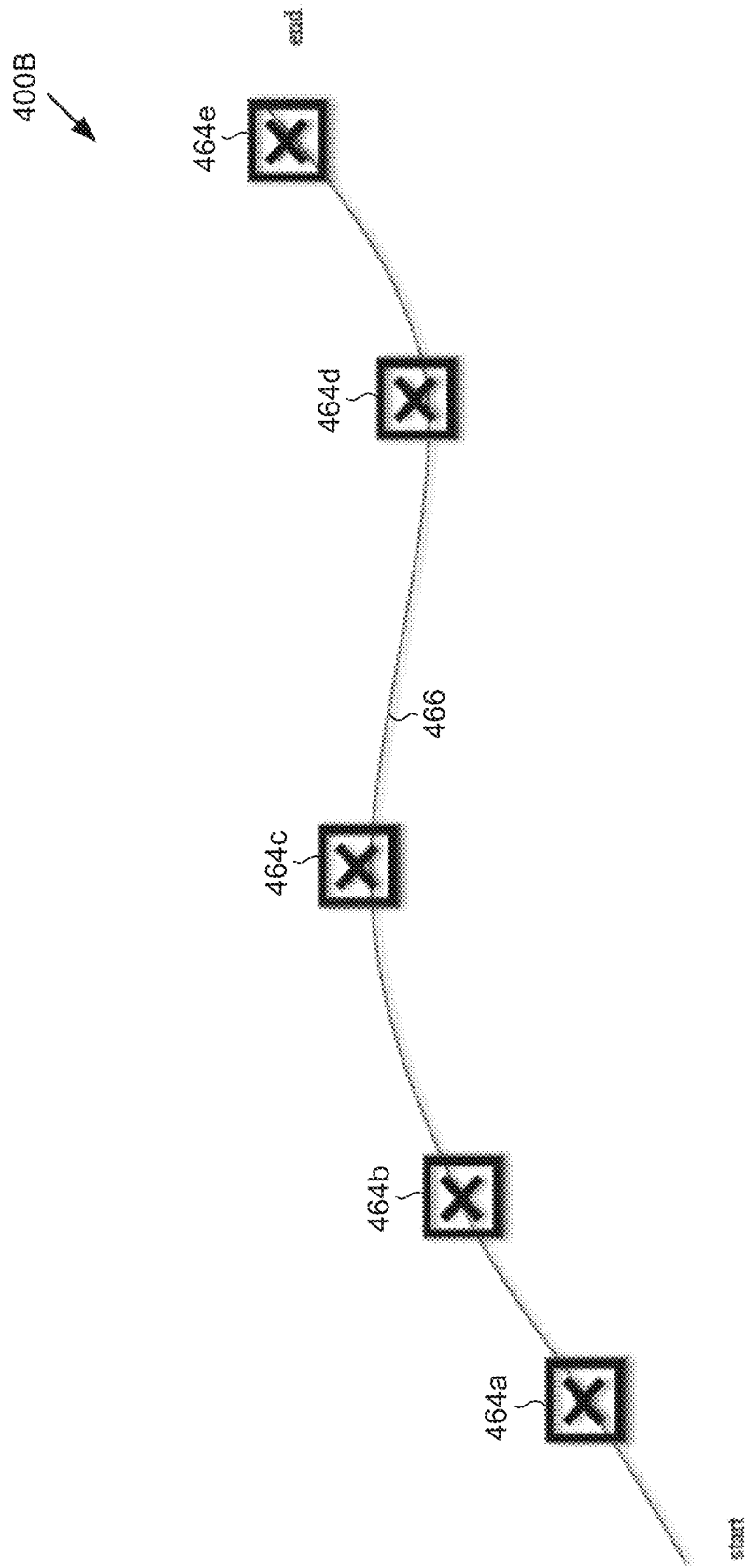
FIG. 4B shows a diagram of an exemplary content compilation trajectory among feature space landmarks, according to one implementation.

Each expertly composited content compilation can be visualized as a trajectory among the feature space landmarks 464 of multi-dimensional feature space 460. That is to say, in some implementations, each of content units 136/336 may further include a feature space landmark 464 identifier corresponding to one or more of multiple content clusters in multi-dimensional feature space 460, and each expertly composited content compilation can be visualized as a trajectory along the sequence of feature space landmarks 464 identified by the content units composited into that content compilation. An example of such a trajectory, with a merely exemplary length of five content units in the interests of conceptual clarity, is shown by diagram 400B in FIG. 4B. FIG. 4B shows content compilation trajectory 466 starting at feature space landmark 464a, continuing sequentially to respective feature space landmarks 464b. 464c, and 464d, and ending at feature space landmark 464e.

In some implementations, selection of the first content unit in action 230 may be based on the first content units in the expertly composited content compilations serving as exemplars. That is to say, action 230 may include determining a first desirable feature space landmark for the first content unit, and selecting the first content unit based on the first desirable feature space landmark.

Merely by way of example, let it be assumed that each expertly composited content compilation includes a first content unit having a feature space landmark identifier for one of feature space landmarks 464a, 464b, or 464c, but no other feature space landmarks. Let it be further assumed that feature space landmark 464a is identified most often chosen by the first content element in an expertly composited content compilation, followed by feature space landmark 464b, which in turn is identified more frequently than feature space landmark 464c.

To select the first content unit in action 230, the feature space landmark identifier of each of content units 136/336 may be obtained, and the weighted distance of each feature space landmark identified by those content units from each of the expert selected starting feature space landmarks 464a, 464b, and 464c may be determined. It is noted that the weights applied to the distances described above may be the inverse ratios of the number of times each of feature space landmarks 464a, 464b, and 464c was identified by the first content unit in the expertly composited content compilations. Finally, the weighted distances of each of the feature space landmarks identified by the content units from each of feature space landmarks 464a. 464b, and 464c can be averaged. In this particular use case, the characteristic determining the desirability of the feature space landmark of the content unit to be selected as the first content unit for beginning the content compilation in action 230 may be its averaged weighted distance from feature space landmarks 464a, 464b, and 464c. The content unit that identifies the feature space landmark having that shortest averaged weighted distance from feature space landmarks 464a, 464b, and 464c may then be selected as the first content unit in action 230.

Flowchart 200 further includes determining similarity metrics each of which compares end descriptor 350b of the first content unit selected in action 230 with start descriptor 350a of each of the other content units of multiple content units 136/336 (action 240). Action 240 may be performed by software code 110, executed by processing hardware 104 of computing platform 102. It is noted that although the exemplary implementations described below refer to the similarity metrics determined in action 240 as corresponding to Euclidean distances, that characterization is merely provided by way of example. In other implementations, the similarity metrics determined in action 240 may include Manhattan distances (also known as L1-distances), or may include other similarity measures, such as cosine similarity for example. In various implementations, these similarity metrics determined in action 240 measure the distance between vectors in a multi-dimensional vector space as a means of quantifying their similarity.

Figure 5A:
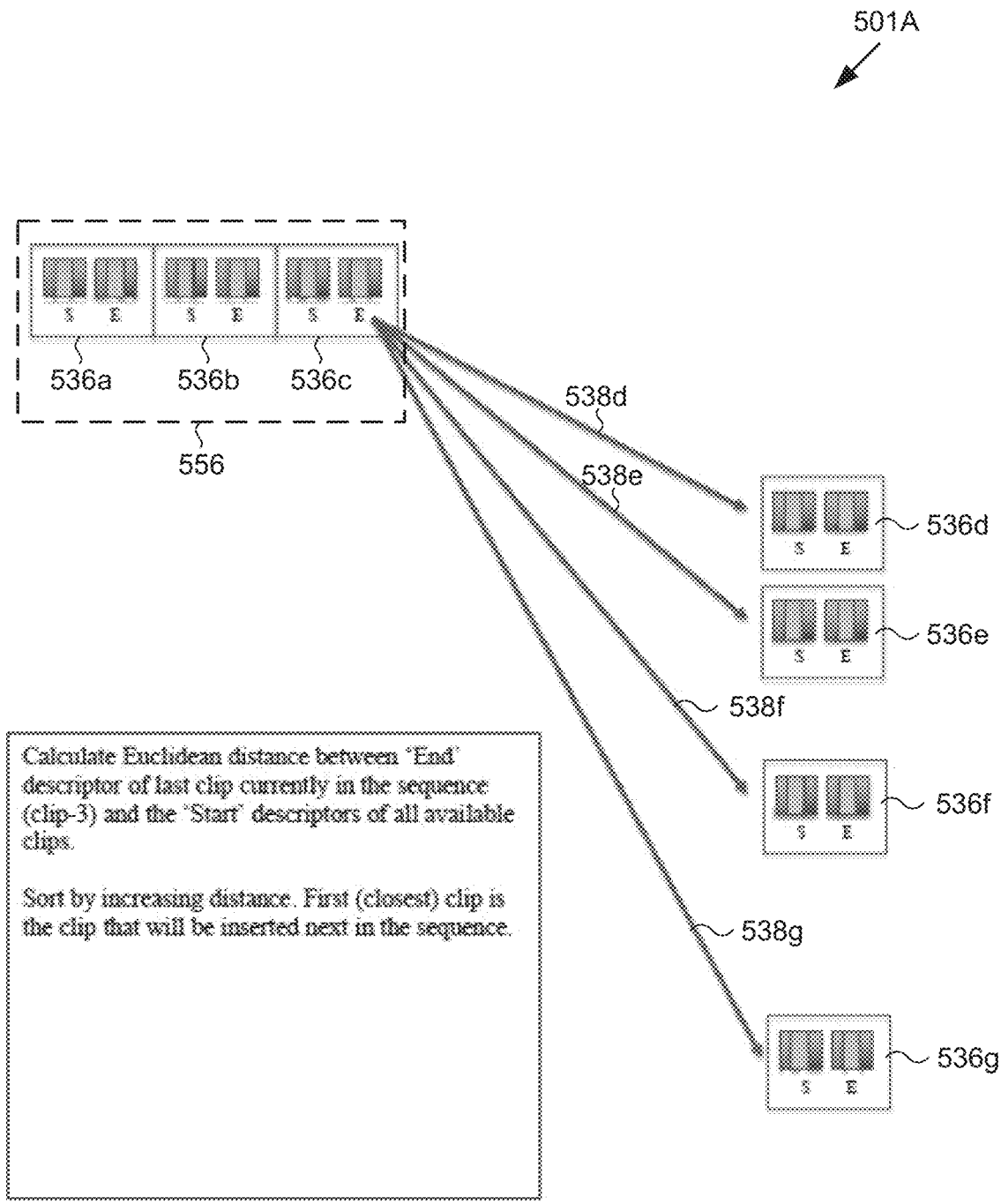
FIG. 5A shows a diagram depicting compositing of a content compilation, according to one exemplary implementation.

Referring to FIG. 5A. FIG. 5A shows diagram 501A depicting compositing of content compilation 556, according to one exemplary implementation. Content compilation 556 is shown to be partially composited and to include first content unit 536a, second content unit 536b, and third content unit 536c. Also shown in FIG. 5A are other, not yet composited content units 536d, 536e. 536f, and 536g (hereinafter "content units 536d-536g"), as well as distances 538d, 538e, 538f, and 538g (hereinafter "distances 538d-538g") of a start descriptor of each of respective content units 536d-536g from the end descriptor of third content unit 536c.

It is noted that, according to the exemplary implementation shown in FIG. 5A, distances 538d-538g correspond to the similarity metrics determined in action 240. Thus, referring to FIGS. 2, 3B, and 5A in combination, action 240 may include determining distances 538d-538g of end descriptor 350b of third content unit 356c from start descriptor 350a of each of respective content units 536d-536g. Distances 538d-538g may be the Euclidean distances of the start descriptor 350a of each of respective content units 536d-536g from the end descriptor 350b of third content unit 536c in multi-dimensional feature space 460 described above. It is further noted that each of first content unit 536a, second content unit 536b, third content unit 536c, and content units 536d-536g correspond in general to content unit 336, in FIG. 3A. Thus, each of first content unit 536a, second content unit 536b, third content unit 536c, and content units 536d-536g may share any of the characteristics attributed to content unit 336 by the present disclosure, and vice versa.

Flowchart 200 further includes ranking, using the similarity metrics determined in action 240, content units 536d-536g with respect to one another (action 250). For example, where the similarity metrics determined in action 240 are distances 538d-538g, the ranking performed in action 250 may rank content units 536d-536g based on respective distances 538d-538g, with content unit 536d associated with least distance 538d being ranked highest. i.e., first, and content unit 536g associated with greatest distance 538g being ranked lowest, i.e., last. The ranking of content units 536d-536g in action 250 may be performed by software code 110, executed by processing hardware 104 of computing platform 102.

Flowchart 200 further includes selecting, based on the ranking performed in action 250, a second content unit of multiple content units 136/336 (action 260). Action 260 may be performed by software code 110, executed by processing hardware 104 of computing platform 102, and in some implementations may be performed using machine learning model(s) 120. The specific process depicted by diagram 501A is the selection of a fourth content unit for continuation of the compositing of content compilation 556 from among content units 536d-536g. According to the exemplary implementation shown in FIG. 5A, the content unit among content units 536d-536g having the shortest distance among distances 538d-538g, i.e., content unit 536d, is selected as the fourth content unit for continuing compositing of content compilation 556.

However, it is noted that a process analogous to that described by reference to diagram 501A may be used to select second content unit 536b based on the distance between the end descriptor of first content unit 536a and the start descriptor of second content unit 536b, as well as to select third content unit 536c based on the distance between the end descriptor of second content unit 536b and the start descriptor of third content unit 536c.

As seen in the approach described above by reference to FIG. 5A, at each step in the process software code 110, executed by processing hardware 104, must make a heuristic choice to select the next content unit of content compilation 556. In some implementations, software code 110 may utilize machine learning model(s) to produce content compilation 556 and to learn over time to improve its own selection performance. In some such implementations, machine learning model(s) 120 receives as input the end descriptor of the last content unit already in partially composited content compilation 556, i.e., third content unit 536c, and all of the start descriptors of a predetermined number "k" of ranked content units 536d-536g joined end-to-end as one complete input feature vector. It is noted that the integer value k is a hyperparameter for the system that can be set and selectably modified by an administrator of system 100. It is further noted that top k candidate content units are selected on the same distance based approach described above. Thus, the top k content units are the k closest clips to the last clip already composited into content compilation 556 in feature vector space 460.

Machine learning model(s) 120 produces k outputs, representing the 1-of-k choices that must be made in order to select the next content unit for continuing content compilation 556. The learning objective for machine learning model(s) 120 is to pick a best next content unit from among the best k candidates available to it.

Figure 5B:
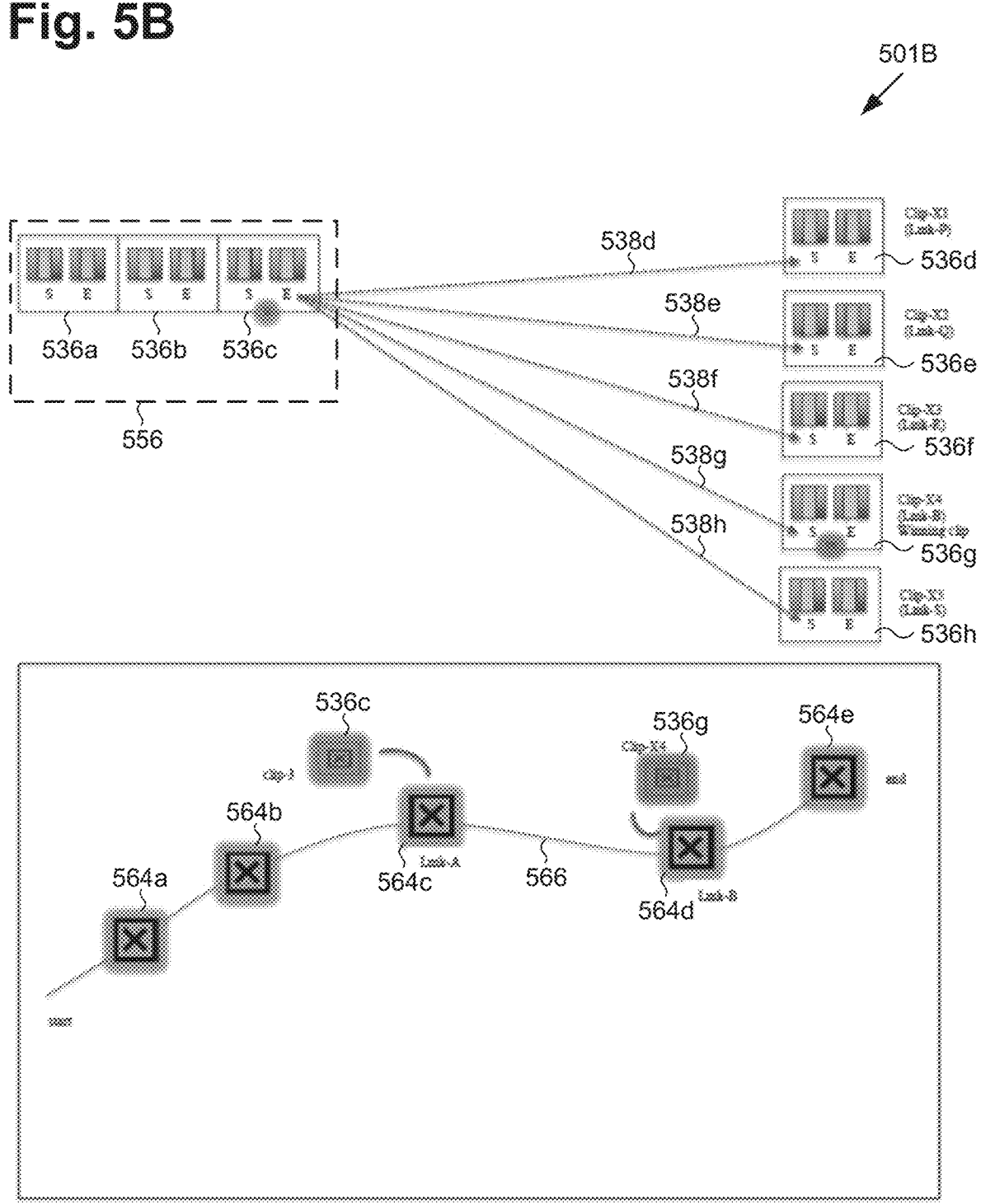
FIG. 5B shows a diagram depicting compositing of a content compilation, according to another exemplary implementation.

As noted above by reference to FIGS. 4A and 4B, in some implementations, each of first content unit 536a, second content unit 536b, third content unit 536c, and content units 536d-536g further includes a feature space landmark identifier corresponding to one or more of the content clusters represented by content clusters 462a and 462b in multi-dimensional feature space 460. In those implementations, processing hardware 104 may further execute the software code 110 to identify the feature space landmark for each of first content unit 536a, second content unit 536b, third content unit 536c, and content units 536d-536g, and to select sequential content units for compositing of content compilation 556 further based on those feature spaced landmarks. That is to say, processing hardware 104 may further execute the software code 110 to determine, based on the first feature space landmark for first content unit 536a, a desirable second feature space landmark for second content unit 536b, and to select second content unit 536b further based on that desirable second feature space landmark in action 260. Referring to FIG. 5B, FIG. 5B depicts compositing of content compilation 556 using such an approach.

FIG. 5B shows diagram 501B depicting compositing of content compilation 556, according to another exemplary implementation. Content compilation 556 is shown to be partly composited and to include first content unit 536a, second content unit 536b, and third content unit 536c. Also shown in FIG. 5B are other, not yet composited content units 536d. 536e, 536f. 536g, and 536h (hereinafter "content units 536d-536h"), as well as distances 538d. 538e, 538f, 538g, and 538*h* (hereinafter "distances 538*d*-538*h*") of a start descriptor of each of respective content units 536*d*-536*h* from the end descriptor of third content unit 536*c*. In addition, diagram 501B shows trajectory 566 of content compilation 556. Trajectory 566 begins at feature space landmark 564*a* identified by first content unit 536*a*, continues through feature space landmarks 564*b* and 564*c* identified by respective second and third content units 536*b* and 536*c*, and continues through feature space landmarks 564*d*, 564*e*. 564*f*, and 564*g*, respectively, before ending at feature space landmark 564*h*.

Each of feature space landmarks 564*a*. 564*b*, 564*c*. 564*d*, 564*e*, 564*f*. 564*g*, and 564*h* (hereinafter "feature space landmarks 564*a*-564*h* corresponds in general to any of feature space landmarks 464*a*, 464*b*. 464*c*, 464*d*, and 464*e* (hereinafter "feature space landmarks 464*a*-464*e*") shown in FIG. 4A or 4B. Thus, each of feature space landmarks 564*a*-564*h* may share any of the characteristics attributed to any of feature space landmarks 464*a*-464*e* by the present disclosure, and vice versa.

Referring to FIGS. 1 and 5B in combination, in some implementations, machine learning model(s) 120 have been trained as sequence prediction model(s) using the corpus of expertly composited content compilations described above by reference to FIGS. 4A and 4B. When implemented as sequence prediction model(s), machine learning model(s) may take the form of one or more of a recurrent neural network (RNN), having a long short-term memory (LSTM) architecture, for example, or as any finite-state transducer. Machine learning model(s) are configured to predict the next feature space landmark in trajectory 566 of content compilation 556, given the previous partial order of feature space landmarks.

The prediction takes the form of probabilities, one each for each of the possible feature space landmarks. The feature space landmark with the highest probability is identified as the next feature space landmark in the sequence of trajectory 566. Consider the last content unit composited into content compilation 556 thus far, i.e., third content unit 536*c*. In order to select the next clip, i.e., the fourth content unit for content compilation 556, feature space landmark 564*c* identified by third content unit 536*c*, as well as, in some implementations, one or both of feature space landmarks 564*a* and 564*b* identified by respective first content unit 536*a* and second content unit 536*b*, can be analyzed by machine learning model 120 to predict a list of desirable feature space landmarks for use as next feature space landmark 564*d* of trajectory 566. From that list, the feature space landmark having the highest probability may be selected as feature space landmark 564*d*. Then, from the ranking of the content units described above by reference to action 250 and FIG. 5A, based on distances 538*a*-538*h*, the highest ranked content unit including the feature space landmark identifier of the feature space landmark selected as feature space landmark 564*d* may then be selected as the next content unit. i.e., the fourth content unit.

As shown in FIG. 5B, the feature space landmark identifier of feature space landmark 564*d* selected as the next feature space landmark of trajectory 566 is Lmk-B. Of ranked content units 536*d*-536*h*, only content unit 536*g* includes feature space landmark identifier Lmk-B. Consequently, despite being ranked lower than content units 536*d*. 536*e*, and 536*f*, content unit 536*g* may be selected as the fourth content unit of content compilation 556.

It is possible that none of content units 536*d*-536*h* includes the feature space landmark identifier of the feature space landmark having the highest probability predicted by machine learning model(s) 120. Under those circumstances, the feature space landmark having the second highest probability may be selected as feature space landmark 564*d* of trajectory 566, and the fourth content unit may then be selected based on being the highest ranked of content units 536*d*-536*e* including the feature space landmark identifier for the second highest probability feature space landmark may be selected as the fourth content unit of content compilation 556. This selection process may continue until the fourth content unit of content compilation is successfully identified.

It is noted that although the specific example shown and described by reference to FIG. 5B refers to selection of the fourth content unit of content compilation 556, a process analogous to that described by reference to diagram 501B may be used to select second content unit 536*b*, third content unit 536*c*, and so forth. Thus, in some implementations, action 260 may include determining, based on the first feature space landmark identified by first content unit 536*a*, desirable second feature space landmark 564*b* for second content unit 536*b*, and selecting second content unit 536*b* further based on desirable second feature space landmark 564*b*. Moreover, in some implementations, second content unit 536*b* may be selected by software code 110, executed by processing hardware 104 of computing platform 102, and using machine learning model(s) 120.

In some implementations, flowchart 200 can continue and conclude with compositing of content compilation 556 using second content unit 536*b* (action 270). As noted above, the automated method outlined by flowchart 200 follows a heuristic approach to composite content compilation 556 beginning with first content unit 536*a* selected in action 230. The process of compositing of content compilation 556 can further include selecting third content unit 536*c*, selecting content unit 536*d* as the fourth content unit of content compilation 556, selecting one of content units 536*e*, 536*f*, or 536*g* as the fifth content unit of content compilation 556, and so forth. Action 270 may be performed by software code 110, executed by processing hardware 104 of computing platform 102, and results in production of composited content compilation 128.

Although in some implementations flowchart 200 can conclude with action 270, in implementations in which second content unit 536*b* is selected using machine learning model(s) 120, flowchart 200 may further include obtaining usage data 134 corresponding to an engagement level of user 118 with composited content compilation 128 (action 280), and training machine learning model(s) 120 using usage data 134, resulting in an improved selection performance by machine learning model(s) 120 (action 290). As noted above, usage data 134 corresponds to the engagement level of user 118 with composited content compilation 128. Such an engagement level may be determined based on how much of composited content compilation 128 user 118 consumes: either user 118 consumes composited content compilation 128 in its entirety, which can be taken as a positive sign, or if user 118 abandons it part way through, that could be construed as some measure of dislike or non-engagement.

Figure 6A:
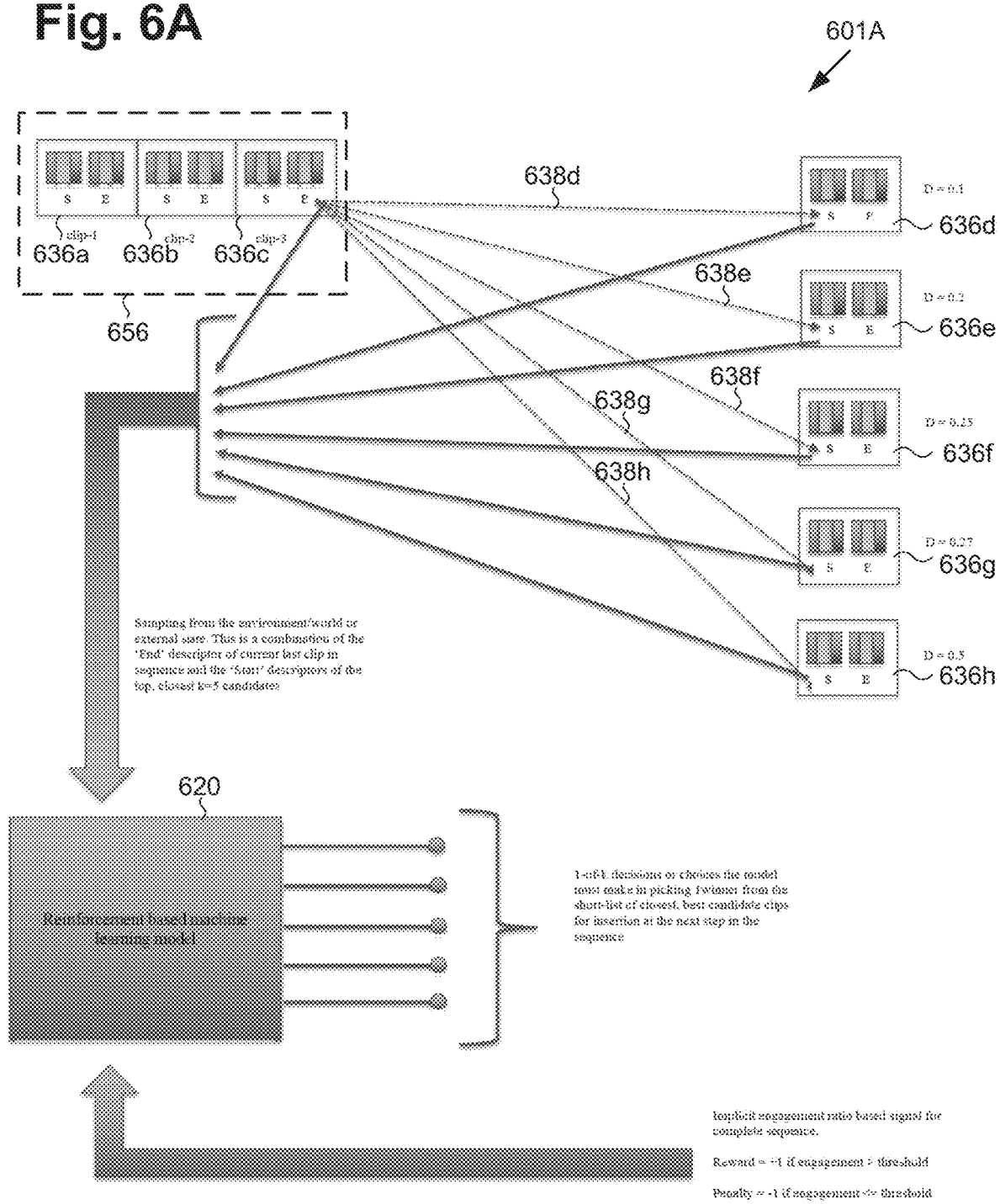
FIG. 6A shows a diagram depicting compositing of a content compilation, according to yet another exemplary implementation.
Figure 6B:
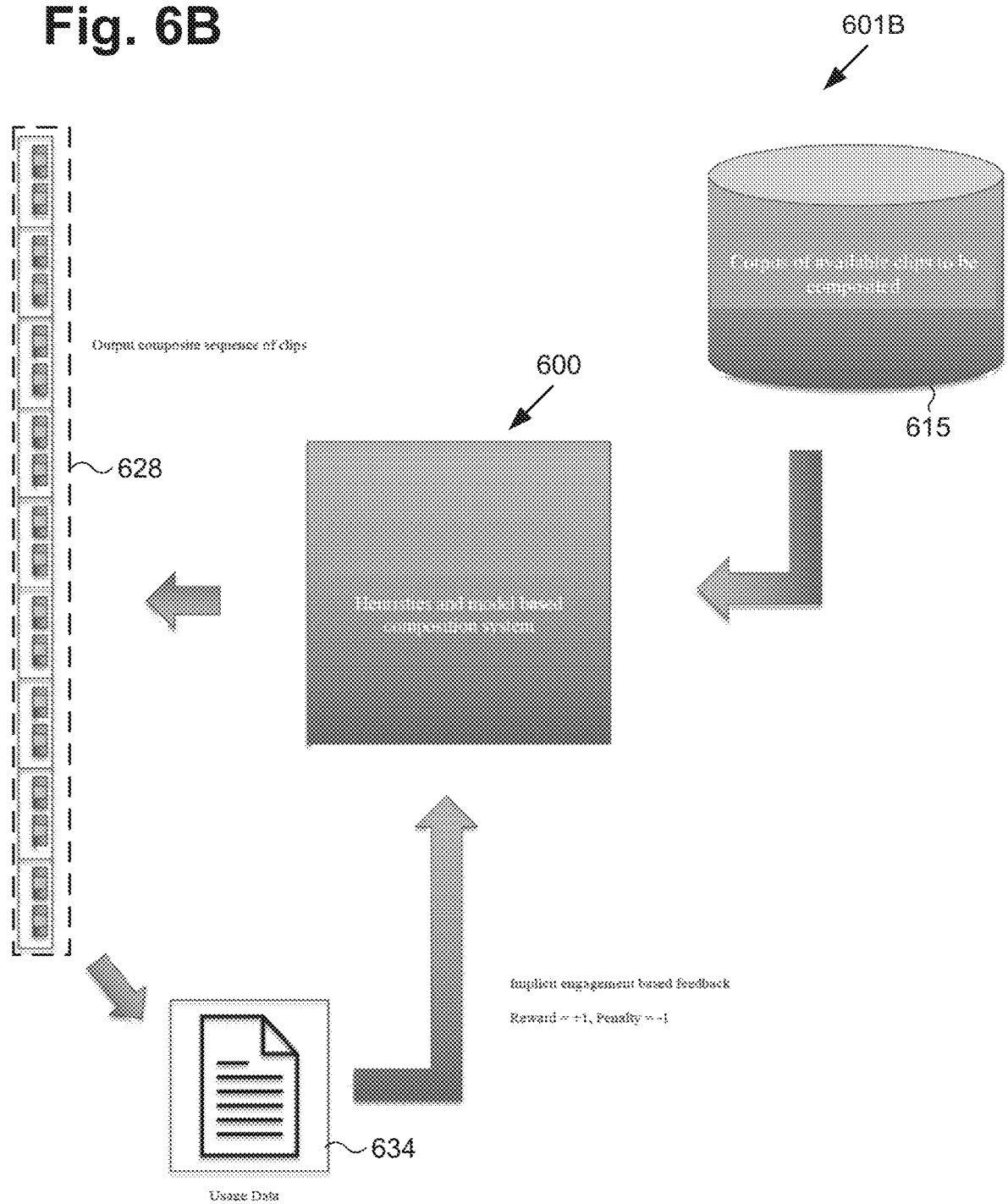
FIG. 6B shows a diagram depicting production of an implicit signal for improving content sequencing performance for compositing of a content compilation, based on usage data.

FIG. 6A shows diagram 601A depicting production of an implicit signal for improving the selection performance of the system shown in FIG. 1, based on usage data, while FIG. 6B shows diagram 601B depicting production of an implicit signal for improving content sequencing performance for compositing of a content compilation, based on usage data. As shown in FIG. 6A, content compilation 656 is shown to be partly composited and to include first content unit 636*a*, second content unit 636*b*, and third content unit 636*c*. Also shown in FIG. 6A are other, not yet composited content units 636d, 636e, 636f, 636g, and 636h (hereinafter "content units 636d-636h"), as well as distances 638d. 638e. 638f, 638g, and 638h (hereinafter "distances 638d-638h") of a start descriptor of each of respective content units 636d-636h from the end descriptor of third content unit 636c. In addition, diagram 601A shows exemplary reinforcement based machine learning model 620.

It is noted that each of first content unit 636a, second content unit 636b, third content unit 636c, and content units 636d-636h correspond in general to content unit 336, in FIG. 3A. Thus, each of first content unit 636a, second content unit 636b, third content unit 636c, and content units 636d-636h may share any of the characteristics attributed to content unit 336 by the present disclosure, and vice versa. It is further noted that distances 638d-668g, in FIG. 6A, correspond respectively in general to distances 538d-538g, in FIGS. 5A and 5B, while distance 638h corresponds in general to distance 538h in FIG. 5B. Moreover, reinforcement based machine learning model 620 corresponds in general to machine learning model(s) 120, in FIG. 1, and those corresponding features may share any of the characteristics attributed to either corresponding feature by the present disclosure.

FIG. 6B shows content compilation 628 composited by system 600 for automated compositing of content compilations, and usage data obtained by system 600. Also shown in FIG. 6B is corpus 615 of content clips available for compositing. System 600, content compilation 628, and usage data 634 correspond respectively in general to system 100, content compilation 128, and usage data 134, in FIG. 1. Thus, system 600, content compilation 628, and usage data 634 may share any of the characteristics attributed to system 100, content compilation 128, and usage data 134 by the present disclosure, and vice versa.

Using a predetermined threshold for the engagement level, usage data 134/634 may be used to produce an implicit signal that system 100/600 can use to improve the sequencing performance of reinforcement based machine learning model 620. As discussed above, at each step in the process of compositing content compilation 128/628, system 100/600 must make a heuristic choice to select the next clip in the sequence. According to the exemplary implementation shown in FIG. 6A reinforcement based machine learning model 620 can, over the course of time, learn the best clip to insert at the present position that works over and above that of the basic heuristic process.

For example, reinforcement based machine learning model 620 model may receive as input the end descriptor of the last clip already in partially constructed sequence so far, e.g., third content clip 636c, and all of the start descriptors of the top k candidate clips (e.g., content clips 636d-636h), joined end-to-end as one complete input feature vector. Here, the number k is a hyperparameter for system 100/600 that can be set and selectably modified by an administrator of system 100/600. It is noted that the top k candidate clips may be selected on the same Euclidean or other distance based approach outlined above by examining all content clips that are not already include in partially composited content compilation 656. This means that the top k content clips are the k closest content clips to the last clip already in the sequence (e.g., third content clip 636c), in feature vector space. The input feature vector applied to reinforcement based machine learning model 620 model represents the 'current state of the world' in reinforcement based machine learning parlance. Reinforcement based machine learning model 620 has k outputs, representing the 1-of-k choices that must be made in selecting the next content clip in the sequence. The learning objective for reinforcement based machine learning model 620 is to select a next best content clip from the k candidates available to it.

After the process depicted in FIG. 6A has constructed the full sequence using a combination of heuristics for short-listing the top-k candidate content clips (e.g. as referenced in FIG. 5A) and a trainable landmark traversal model to select a best next content clip from among those candidates at each step in the sequence (e.g. as referenced in FIG. 5B), the final composited content compilation 128/628 is presented to user 118. Based on usage data 134/634 describing how user 118 engages with the composition, for example the percentage of content compilation 128/628 viewed by user 118 before user 118 abandons content compilation 128/628, an implicit signal can be generated and can be used for further training or retraining of reinforcement based machine learning model 620. For example, as depicted in FIG. 6B, a reward or penalty may be assessed for composited content compilation 128/628, characterized by real numbers for instance, e.g., +1.0 for reward. −1.0 as a penalty. This reward or penalty can be applied or back-propagated through a reinforcement learning model of machine learning model 620 so that reinforcement based machine learning model 620 can, over the course of multiple iterations, learn to composite content compilations that are sequenced such that user 118 is likely to consume them in their entirety and possibly return to again and again.

As shown in FIG. 1, usage data 134/634 may be obtained in action 280 from usage database 126 or user system 130, via communication network 114 and network communication links 116. Actions 280 and 290 may be performed by software code 110, executed by processing hardware 104 of computing platform 102. One advantage of the approach described by reference to FIGS. 6A and 6B is that even an initially untrained machine learning model can make effective choices from the candidate clips, because the candidate clips are already short-listed based on desirable characteristics. e.g., closeness to the last clip already in the sequence. Over the course of time as the machine learning model receives feedback based on usage data 134/634, the machine learning model can continue to improve.

Referring to FIG. 7, FIG. 7 shows flowchart 700 presenting an exemplary method for use by system 100 to perform automated compositing of content compilations, according to another implementation. With respect to the actions outlined in FIG. 7, it is noted that certain details and features have been left out of flowchart 700 in order not to obscure the discussion of the inventive features in the present application.

Referring to FIGS. 1, 3A, and 3B in conjunction with FIG. 7, flowchart 700 begins with receiving multiple content units 136/336, each one of the content units 136/336 including start descriptor 350a for an initial content segment and end descriptor 350b for a last content segment (action 710). Action 710 may be performed by software code 110, executed by processing hardware 104 of computing platform 102, in the manner described above by reference to action 210 of flowchart 200.

Flowchart 700 further includes identifying start descriptor 350a and end descriptor 350b for each one of content units 136/336 (action 720). Action 720 may be performed by software code 110, executed by processing hardware 104 of computing platform 102, by accessing content and feature set database 112.

Flowchart 700 further includes identifying multiple candidate content compilations, each of the candidate compilations including multiple content units 136/336 in a different temporal sequence (action 730). For example, where multiple content units 136/336 include three content units: e.g., content unit A, content unit B, and content unit C, action 730 may result in identification of three factorial (3!), i.e., six, candidate compilations: ABC, ACB, BAC, CAB, BCA, CBA, while any integer number "n" of multiple content units 136/336 may result in identification of up to n! content compilations. Thus, the candidate compilations identified in action 730 may include all n! permutations of multiple content units 136/336, or any subset thereof. Moreover, the different permutations of candidate compositions can be used to compile a set of similarity metrics with which each candidate composition can be ranked and the best one be identified, as described below by reference to actions 740 and 750. It is noted that such similarity metrics may be compiled using one or both of the baseline heuristic approach described above by reference to FIG. 5A, or the landmark traversal approach described above by reference to FIG. 5B. Action 730 may be performed by software code 110, executed by processing hardware 104 of computing platform 102.

Flowchart 700 further includes, for each one of the candidate content compilations identified in action 730, determining, by comparing the end descriptor of each of the content units to the start descriptor of the next content unit in the temporal sequence, a score or a continuity score for that candidate content compilation, resulting in multiple continuity scores (action 740). In one implementation in which each candidate content compilation includes "n" content units, for example, the distance in a multi-dimensional feature space separating the end descriptor of each of the first 1 to (n−1) content units to the start descriptor of the next content unit in the temporal sequence of each candidate content compilation may be computed, in a manner analogous to that described above by reference to FIG. 5A. In that implementation, the continuity score may be determined to be the sum of those distances for each candidate content compilation.

As noted above by reference to FIGS. 4A, 4B, and 5B, in some implementations, each of multiple content units 136/336 further includes a feature space landmark identifier corresponding to one or more content clusters in a multi-dimensional feature space. In those implementations, the continuity score for each of the candidate content compilations may further be determined by comparing the feature space landmark identifier of each content unit of the candidate content compilation to the feature space landmark of the next content unit in the temporal sequence of that candidate content compilation. For example, based on the comparison of the feature space landmark identifiers, a trajectory of each candidate content compilation in the multi-dimensional feature space may be determined, and that trajectory could be compared to the trajectories of the corpus of expertly composited content compilations described above. Action 640 may be performed by software code 110, executed by processing hardware 104 of computing platform 102, and in some implementations, using machine learning model(s) 120.

In some implementations, flowchart 700 may continue and conclude with selecting, based on the continuity scores determined in action 740, a best content compilation from among the candidate content compilations (action 750). It is noted that, depending on the specific way in which the continuity score is determined, the best candidate content compilation may be the candidate content compilation having the highest, or the lowest, continuity score. For example, in implementations in which the sum of the distances separating the end descriptor of each of the first 1 to (n−1) content units to the start descriptor of the next content unit in the temporal sequence of each candidate content compilation determines the continuity score, the candidate content compilation having the lowest score. i.e., smallest sum of distances, may be selected as the best content compilation. Action 750 may be performed by software code 110, executed by processing hardware 104 of computing platform 102.

Although in some implementations flowchart 700 can conclude with action 750, in implementations in which the best content compilation is selected in action 750 using machine learning model(s) 120, flowchart 700 may further include obtaining usage data 134 corresponding to an engagement level of user 118 with the selected best content compilation (action 760), and training machine learning model(s) 120 using usage data 134, resulting in an improved selection performance by machine learning model(s) 120 (action 770). Actions 760 and 770 may be performed by software code 110, executed by processing hardware 104 of computing platform 102, in a manner analogous to actions 280 and 290 described above.

With respect to the methods outlined by flowcharts 200 and 700, it is noted that actions 210, 220, 230, 240, 250, 260, and 270, or actions 210, 220, 230, 240, 250, 260, 270, 280, and 290, or actions 710, 720, 730, 740, and 750, or actions 710, 720, 730, 740, 750, 760, and 770, may be performed in an automated process from which human involvement can be omitted.

Thus, the present application discloses automated systems and methods for compositing content compilations that address and overcome the deficiencies in the conventional art. As described above, according to the present automated compositing solution, information about features of content units, such as their audio features, the images they include, and their semantic features, for example, are extracted and used to automate the compositing of the content units in a manner that produces results comparable in quality to those produced by an expert human content editor. In contrast to conventional techniques for creating content compilations, the present solution can advantageously work with content that spans a wide range of themes and topics, as well as a host of visual styles and audio tracks created by different artists in different settings and for different purposes. In addition, according to the present compositing solution a user supplied template or layout, which is typically relied upon in conventional content compilation techniques, is neither sought nor utilized. As a result, the present solution advantageously enables the automated production of a coherent content compilation without abrupt switches in visual style, story arc, or audio effects.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
 a computing platform including a processing hardware and a system memory storing a software code;
 the processing hardware configured to execute the software code to:
  receive a plurality of content units, the plurality of content units comprising at least one of: (i) content having a plurality of different themes, or (ii) content on a plurality of different topics, each one of the plurality of content units including a start descriptor for an initial content segment and an end descriptor for a last content segment;
  identify the start descriptor and the end descriptor for each one of the plurality of content units;
  select a first content unit of the plurality of content units for beginning a content compilation;
  determine a plurality of similarity metrics each comparing the end descriptor of the first content unit with the start descriptor of a respective one of other content units of the plurality of content units;
  rank, using the plurality of similarity metrics, the one other content unit of the plurality of content units with respect to one another;
  select, based on the rank, a second content unit of the plurality of content units; and
  composite the content compilation using the second content unit.

2. The system of claim 1, wherein each one of the plurality of content units further includes a feature space landmark identifier corresponding to one or more of a plurality of content clusters in a multi-dimensional feature space, and wherein the processing hardware is further configured to execute the software code to:
 identify the feature space landmark for each of the plurality of content units; and
 determine a first desirable feature space landmark for the first content unit;
 wherein the first content unit is selected based on the first desirable feature space landmark.

3. The system of claim 1, wherein each one of the plurality of content units further includes a feature space landmark identifier corresponding to one or more of a plurality of content clusters in a multi-dimensional feature space, and wherein the processing hardware is further configured to execute the software code to:
 identify the feature space landmark for each of the plurality of content units; and
 determine, based on a first feature space landmark for the first content unit, a desirable second feature space landmark for the second content unit;
 wherein the second content unit is selected further based on the desirable second feature space landmark.

4. The system of claim 3, wherein the second content unit is selected using a machine learning model, and wherein the processing hardware is further configured to execute the software code to:
 obtain usage data corresponding to an engagement level of a user with the composited content compilation; and
 train, using the usage data, the machine learning model, resulting in an improved selection performance by the machine learning model.

5. The system of claim 1, wherein the second content unit is selected using a machine learning model, and wherein the processing hardware is further configured to execute the software code to:
 obtain usage data corresponding to an engagement level of a user with the composited content compilation; and
 train, using the usage data, the machine learning model, resulting in an improved selection performance by the machine learning model.

6. The system of claim 1, wherein, for each of the plurality of content units, the start descriptor and the end descriptor comprise respective vectors in a multi-dimensional feature space, and wherein the plurality of similarity metrics each corresponds to a distance between the end descriptor for the first content unit and the start descriptor for the respective one of other content units of the plurality of content units in the multi-dimensional vector space.

7. The system of claim 6, wherein the plurality of content units comprise audio-video (AV) clips of content from a plurality of different genres, and wherein for each of the plurality of AV clips, each of the start and end descriptors comprises an audio feature vector component, an image feature vector component, and a keyword feature vector component.

8. The system of claim 7, wherein for each of the plurality of AV clips, each of the start and end descriptors further comprises a semantic feature vector component based on a written synopsis of the AV clip.

9. A method for use by a system including a computing platform having a processing hardware, and a system memory storing a software code, the method comprising:
 receiving, by the software code executed by the processing hardware, a plurality of content units, the plurality of content units comprising at least one of: (i) content having a plurality of different themes, or (ii) content on a plurality of different topics, each one of the plurality of content units including a start descriptor for an initial content segment and an end descriptor for a last content segment;
 identifying, by the software code executed by the processing hardware, the start descriptor and the end descriptor for each one of the plurality of content units;
 selecting, by the software code executed by the processing hardware, a first content unit of the plurality of content units for beginning a content compilation;
 determining, by the software code executed by the processing hardware, a plurality of similarity metrics each comparing the end descriptor of the first content unit with the start descriptor of a respective one of other content units of the plurality of content units;
 ranking, by the software code executed by the processing hardware and using the plurality of similarity metrics, the one other content unit of the plurality of content units with respect to one another;
 selecting, by the software code executed by the processing hardware and based on the ranking, a second content unit of the plurality of content units; and
 compositing, by the software code executed by the processing hardware, the content compilation using the second content unit.

10. The method of claim 9, wherein each one of the plurality of content units further includes a feature space landmark identifier corresponding to one or more of a plurality of content clusters in a multi-dimensional feature space, the method further comprising:
 identifying, by the software code executed by the processing hardware, the feature space landmark for each one of the plurality of content units; and
 determining, by the software code executed by the processing hardware, a first desirable feature space landmark for the first content unit;

wherein the first content unit is selected based on the first desirable feature space landmark.

11. The method of claim 9, wherein each one of the plurality of content units further includes a feature space landmark identifier corresponding to one or more of a plurality of content clusters in a multi-dimensional feature space, the method further comprising:
identifying, by the software code executed by the processing hardware, the feature space landmark for each one of the plurality of content units; and
determining, by the software code executed by the processing hardware and based on a first feature space landmark for the first content unit, a desirable second feature space landmark for the second content unit;
wherein the second content unit is selected further based on being the desirable second feature space landmark.

12. The method of claim 11, wherein the second content unit is selected using a machine learning model, the method further comprising:
obtaining, by the software code executed by the processing hardware, usage data corresponding to an engagement level of a user with the composited content compilation; and
training, by the software code executed by the processing hardware and using the usage data, the machine learning model, resulting in an improved selection performance by the machine learning model.

13. The method of claim 9, wherein the second content unit is selected using a machine learning model, the method further comprising:
obtaining, by the software code executed by the processing hardware, usage data corresponding to an engagement level of a user with the composited content compilation; and
training, by the software code executed by the processing hardware and using the usage data, the machine learning model, resulting in an improved selection performance by the machine learning model.

14. The method of claim 9, wherein, for each of the plurality of content units, the start descriptor and the end descriptor comprise respective vectors in a multi-dimensional feature space, and wherein the plurality of similarity metrics each corresponds to a distance between the end descriptor for the first content unit and the start descriptor for the respective one of other content units of the plurality of content units in the multi-dimensional vector space.

15. The method of claim 14, wherein the plurality of content units comprise audio-video (AV) clips of content from a plurality of different genres, and wherein for each of the plurality of AV clips, each of the start and end descriptors comprises an audio feature vector component, an image feature vector component, and a keyword feature vector component.

16. The method of claim 15, wherein for each of the plurality of AV clips, each of the start and end descriptors further comprises a semantic feature vector component based on a written synopsis of the AV clip.

17. A system comprising:
a computing platform including a processing hardware and a system memory storing a software code;
the processing hardware configured to execute the software code to:
receive a plurality of content units, the plurality of content units comprising at least one of: (i) content having a plurality of different themes, or (ii) content on a plurality of different topics, each one of the plurality of content units including a start descriptor for an initial content segment and an end descriptor for a last content segment;
identify the start descriptor and the end descriptor for each one of the plurality of content units;
identify a plurality of candidate content compilations, each of the plurality of candidate compilations including the plurality of content units in a different temporal sequence;
for each one of the plurality of candidate content compilations, determine, by comparing the end descriptor of each of the plurality of content units to the start descriptor of a next one of the plurality of content units in the different temporal sequence, a score for the one of the plurality of candidate content compilations, resulting in a plurality of scores; and
select, based on the plurality of scores, a best content compilation from among the plurality of candidate content compilations.

18. The system of claim 17, wherein each one of the plurality of content units further includes a feature space landmark identifier corresponding to one or more of a plurality of content clusters in a multi-dimensional feature space, and wherein the score for the one of the plurality of candidate content compilations is further determined by comparing the feature space landmark identifier of each of the plurality of content units to the feature space landmark identifier of a next one of the plurality of content units in the different temporal sequence.

19. The system of claim 18, wherein the best content compilation is selected using a machine learning model, and wherein the processing hardware is further configured to execute the software code to:
obtain usage data corresponding to an engagement level of a user with the best content compilation; and
train, using the usage data, the machine learning model, resulting in an improved selection performance by the machine learning model.

20. The system of claim 17, wherein the best content compilation is selected using a machine learning model, and wherein the processing hardware is further configured to execute the software code to:
obtain usage data corresponding to an engagement level of a user with the best content compilation; and
train, using the usage data, the machine learning model, resulting in an improved selection performance by the machine learning model.

* * * * *